US012286963B1

(12) United States Patent
Tseng et al.

(10) Patent No.: US 12,286,963 B1
(45) Date of Patent: Apr. 29, 2025

(54) ACTUATION APPARATUS AND ELECTRONIC PRODUCT

(71) Applicant: Luxshare Intelligent Manufacture Technology (Changshu) Co., Ltd, Changshu (CN)

(72) Inventors: Po-Ying Tseng, Changshu (CN); Kai-Jing Fu, Changshu (CN)

(73) Assignee: LUXSHARE INTELLIGENT MANUFACTURE TECHNOLOGY (CHANGSHU) CO., LTD, Changshu (CN)

( * ) Notice: Subject to any disclaimer, the term of this patent is extended or adjusted under 35 U.S.C. 154(b) by 0 days.

(21) Appl. No.: 18/929,918

(22) Filed: Oct. 29, 2024

(30) Foreign Application Priority Data

Jun. 21, 2024 (CN) .......................... 202410807985.2

(51) Int. Cl.
*F03G 7/06* (2006.01)

(52) U.S. Cl.
CPC ........... *F03G 7/06143* (2021.08); *F03G 7/06* (2013.01); *F03G 7/06114* (2021.08); *F03G 7/0614* (2021.08)

(58) Field of Classification Search
CPC .... F03G 7/06143; F03G 7/06; F03G 7/06114; F03G 7/0614
USPC .................................................. 60/527–529
See application file for complete search history.

(56) References Cited

U.S. PATENT DOCUMENTS

| | | | |
|---|---|---|---|
| 2005/0160858 A1* | 7/2005 | Mernoe | F03G 7/065 |
| | | | 74/469 |
| 2017/0211551 A1* | 7/2017 | Albright | F42B 10/64 |
| 2020/0347834 A1* | 11/2020 | Oßmer | F03G 7/0614 |
| 2023/0204900 A1* | 6/2023 | Hart | F03G 7/06143 |
| | | | 359/819 |
| 2024/0026866 A1* | 1/2024 | Langhorne | G02B 7/09 |

* cited by examiner

*Primary Examiner* — Hoang M Nguyen
(74) *Attorney, Agent, or Firm* — Birch, Stewart, Kolasch & Birch, LLP

(57) ABSTRACT

Provided are an actuation apparatus and an electronic product that belong to the field of actuation apparatus technology. The actuation apparatus includes a support seat, a transmission member, an execution member, a roller, and a shape memory alloy line. The transmission member is slidably disposed on the support seat in a first direction. An abutting surface is disposed on the transmission member. The execution member is slidably disposed on the support seat in a second direction. The roller is rotatably disposed on the execution member. The shape memory alloy line is disposed on the support seat. When powered on and working, the shape memory alloy line is able to drive the transmission member to move. When the transmission member moves, the abutting surface matches the roller to drive the execution member to move. The electronic product includes the preceding actuation apparatus.

17 Claims, 4 Drawing Sheets

ACTUATION APPARATUS AND ELECTRONIC PRODUCT

CROSS-REFERENCE TO RELATED APPLICATION

This application claims priority to Chinese Patent Application No. 202410807985.2 filed Jun. 21, 2024, the disclosure of which is incorporated herein by reference in its entirety.

TECHNICAL FIELD

The present invention relates to the field of actuation apparatus technology and, in particular, to an actuation apparatus and an electronic product.

BACKGROUND

A shape memory alloy (SMA) is an alloy that may return to the shape before deformation when heated. A shape memory alloy line is a line made of a shape memory alloy. When in use, the shape memory alloy line is powered on to generate Joule heat to implement the deformation of the shape memory alloy line. Compared with traditional electromechanical, hydraulic and pneumatic apparatus, an actuation apparatus using the shape memory alloy line has the advantages of simple structure, high energy density, low noise, stability and reliability and can be widely used in fields such as bionic robots, microelectromechanical systems, and aerospace.

However, the execution strain of the shape memory alloy line is relatively small. When applied to the actuation apparatus, the shape memory alloy line is difficult to generate a relatively large actuation stroke in the limited space. To obtain a relatively large stroke, the length of the shape memory alloy line must be increased, which, however, not only increases the structural complexity of the actuation apparatus but also occupies more space.

SUMMARY

An object of the present invention is to provide an actuation apparatus and an electronic product that can increase the actuation stroke on the basis of not increasing the length of a shape memory alloy line.

To achieve this object, the present invention adopts the technical solutions below.

The actuation apparatus includes a support seat, a transmission member, an execution member, a roller, and a shape memory alloy line.

The transmission member is slidably disposed on the support seat in a first direction. An abutting surface is disposed on the transmission member.

The execution member is slidably disposed on the support seat in a second direction. An included angle is arranged between the second direction and the first direction. An included angle is arranged between the second direction and the abutting surface.

The roller is rotatably disposed on the execution member. A rotation axis of the roller is perpendicular to the first direction and the second direction.

The shape memory alloy line is disposed on the support seat. When powered on and working, the shape memory alloy line is able to drive the transmission member to move. When the transmission member moves, the abutting surface matches the roller to drive the execution member to move. When the transmission member moves by a first set distance, the execution member moves by a second set distance. The second set distance is greater than the first set distance.

Preferably, the actuation apparatus further includes a slidable connection assembly. The transmission member is slidably disposed on the support seat through the slidable connection assembly.

Preferably, the slidable connection assembly includes a fixed sliding table, a movable sliding table, and a ball.

The fixed sliding table is disposed on the support seat. The fixed sliding table is provided with a fixed guide groove penetrating in the first direction.

The movable sliding table is disposed on the transmission member. The movable sliding table is provided with a movable guide groove penetrating in the first direction.

The ball is clamped between the fixed guide groove and the movable guide groove.

Preferably, groove walls on two opposite sides of the movable guide groove are movable groove walls. A distance between the two movable groove walls increases gradually in a direction away from a groove bottom of the movable guide groove.

Groove walls on two opposite sides of the movable guide groove are movable groove walls. A distance between the two movable groove walls increases gradually in a direction away from a groove bottom of the movable guide groove.

The ball is clamped between the two fixed groove walls and the two movable groove walls.

Preferably, the transmission member is slidably disposed on the support seat through two groups of slidable connection assemblies.

One group of slidable connection assemblies among the two groups of slidable connection assemblies include N slidable connection assemblies arranged sequentially in a first straight line. Another group of slidable connection assemblies among the two groups of slidable connection assemblies include M slidable connection assemblies arranged sequentially in a second straight line. N is less than M. The first straight line and the second straight line are parallel to the first direction and are spaced apart in the second direction.

Preferably, the support seat includes a support frame and a positioning member.

The execution member is slidably disposed on the support frame.

The positioning member is fixedly disposed on the support frame. The transmission member is slidably disposed on the positioning member.

Preferably, the support seat includes a guide rod. The execution member is slidably sleeved on the guide rod.

Preferably, a plurality of shape memory alloy lines are provided. Two shape memory alloy lines are spaced apart sequentially in the second direction.

Preferably, the actuation apparatus further includes an elastic reset member connected to the support seat and the execution member separately and configured to drive the roller to abut against the abutting surface.

The electronic product includes a working module and the preceding actuation apparatus. The execution member is connected to the working module.

The present invention has the beneficial effects below.

The abutting surface on the transmission member matches the roller on the execution member to perform the effect of displacement amplification. In this case, when the shape memory alloy lines drive the transmission member to move by the first set distance, the execution member is driven, by the rolling of the roller on the abutting surface, to move by the second set distance. The second set distance is greater than the first set distance. In this case, the actuation stroke can be increased on the basis of not increasing the length of the shape memory alloy lines. Moreover, the roller matches the abutting surface smoothly and efficiently, making the structure simple, changing the movement direction, saving the occupied space, and guaranteeing the response speed.

Figure 1:
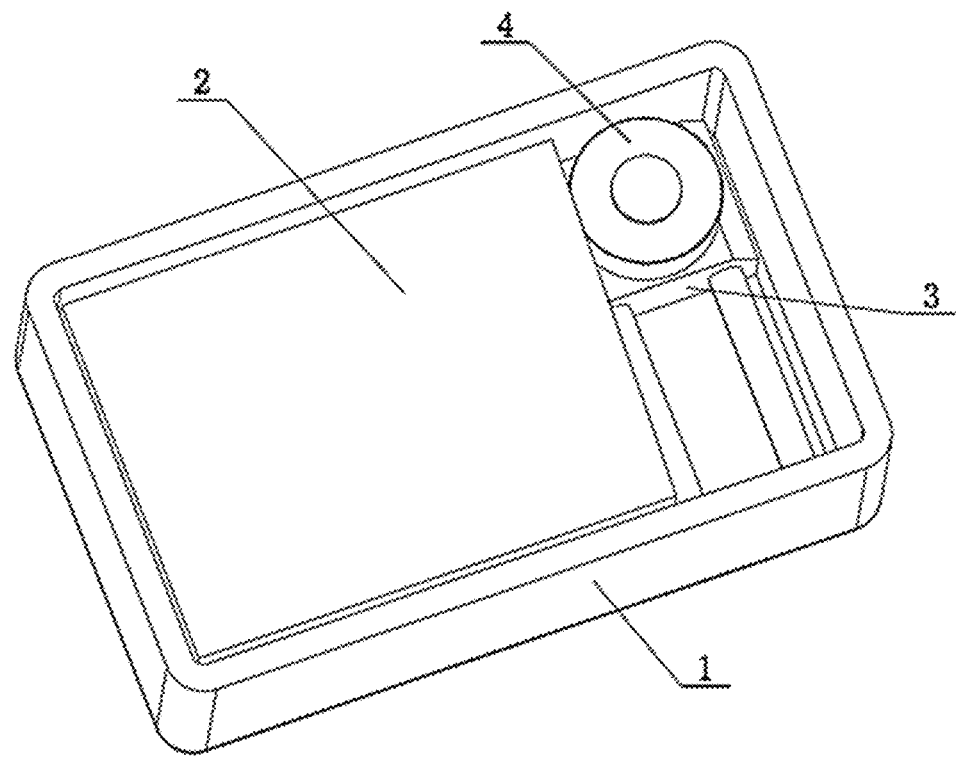
FIG. 1 is a structural view of an actuation apparatus according to an embodiment of the present invention.
Figure 2:
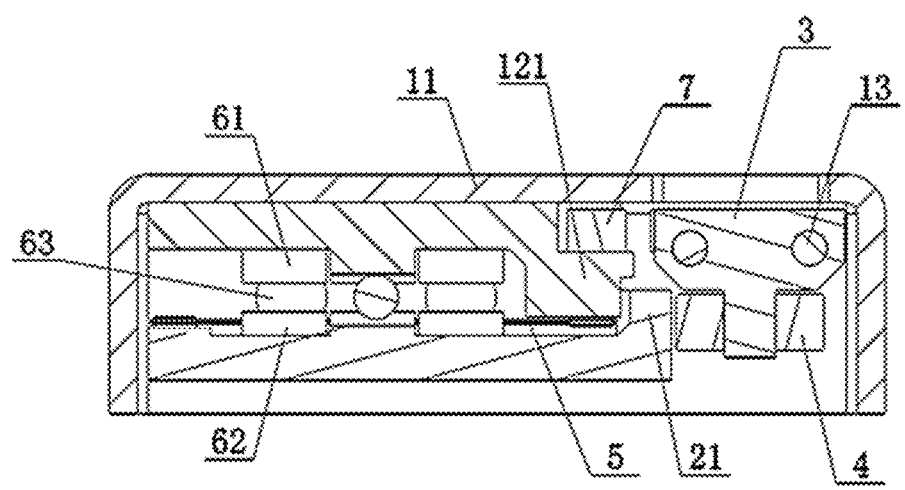
FIG. 2 is a sectional view of an orientation of the actuation apparatus according to the embodiment of the present invention.
Figure 3:
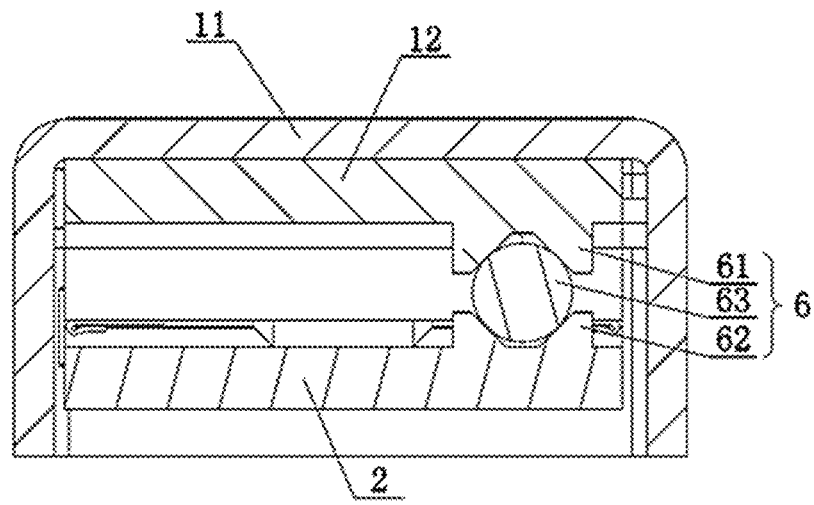
FIG. 3 is a sectional view of another orientation of the actuation apparatus according to the embodiment of the present invention.
Figure 4:
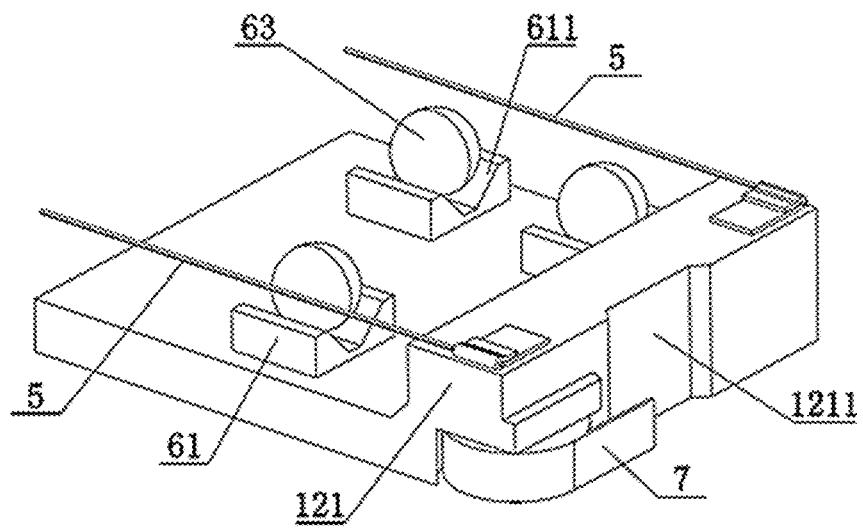
FIG. 4 is view one illustrating a partial structural of the actuation apparatus according to the embodiment of the present invention.
Figure 5:
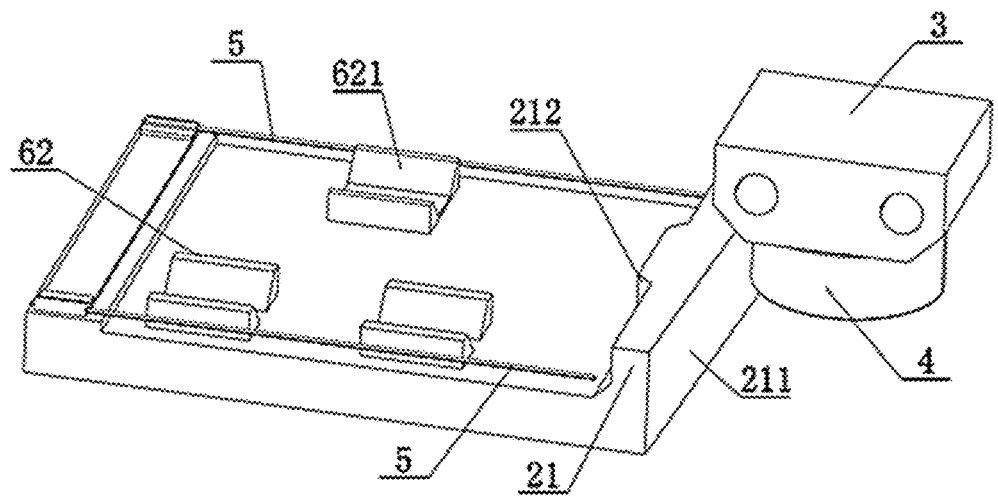
FIG. 5 is view two illustrating a partial structural of the actuation apparatus according to the embodiment of the present invention.

REFERENCE LIST 1 support seat
11 support frame
12 positioning member
121 positioning table
1211 positioning groove
13 guide rod
2 transmission member
21 transmission table
211 abutting surface
212 positioning head
3 execution member
4 roller
5 shape memory alloy line
6 slidable connection assembly
61 fixed sliding table
61 fixed guide groove
62 movable sliding table
621 movable guide groove
63 ball
7 elastic reset member
100 working module

DETAILED DESCRIPTION

Embodiments of the present invention are described in detail below. Examples of the embodiments are illustrated in the drawings, where the same or similar reference numerals indicate the same or similar components or components having the same or similar functions. The embodiments described hereinafter with reference to the drawings are merely exemplary. The embodiments are intended to explain the present invention and are not to be construed as limiting the present invention.

In the description of the present disclosure, unless otherwise expressly specified and limited, the term "connected to each other", "connected", or "fixed" is to be construed in a broad sense, for example, as fixedly connected or detachably connected; mechanically connected or electrically connected; directly connected to each other or indirectly connected to each other via an intermediary; or internally connected or interactional between two elements. For those of ordinary skill in the art, specific meanings of the preceding terms in the present invention may be understood based on specific situations.

In the description of the present invention, unless otherwise expressly specified and limited, when a first feature is described as "on" or "below" a second feature, the first feature and the second feature may be in direct contact or be in contact via another feature between the two features instead of being in direct contact. Moreover, when the first feature is described as "on", "above", or "over" the second feature, the first feature is right on, above, or over the second feature, the first feature is obliquely on, above, or over the second feature, or the first feature is simply at a higher level than the second feature. When the first feature is described as "under", "below", or "underneath" the second feature, the first feature is right under, below, or underneath the second feature, the first feature is obliquely under, below, or underneath the second feature, or the first feature is simply at a lower level than the second feature.

Technical solutions of the present invention are further described hereinafter in conjunction with the drawings and the embodiments.

As shown in FIGS. 1 to 5, the present invention provides an actuation apparatus. The actuation apparatus includes a support seat 1, a transmission member 2, an execution member 3, a roller 4, and a shape memory alloy line 5. The transmission member 2 is slidably disposed on the support seat 1 in a first direction. An abutting surface 211 is disposed on the transmission member 2. An execution member 3 is slidably disposed on the support seat 1 in a second direction. An included angle is arranged between the second direction and the first direction. The included angle is arranged between the second direction and the abutting surface 211. The roller 4 is rotatably disposed on the execution member 3. A rotation axis of the roller 4 is perpendicular to the first direction and the second direction. The shape memory alloy line 5 is disposed on the support seat 1. When powered on and working, the shape memory alloy line 5 is able to drive the transmission member 2 to move. When the transmission member 2 moves, the abutting surface 211 abuts against the roller 4. When the abutting surface 211 abuts against the roller 4, the roller 4 rolls on the abutting surface 211 and drives the execution member 3 to move. When the transmission member 2 moves by a first set distance, the execution member 3 moves by a second set distance. The second set distance is greater than the first set distance.

In the present invention, the abutting surface 211 on the transmission member 2 matches the roller 4 on the execution member 3 to perform the effect of displacement amplification. In this case, when the shape memory alloy line 5 drives the transmission member 2 to move by the first set distance, the execution member 3 is driven, by the rolling of the roller 4 on the abutting surface 211, to move by the second set distance. The second set distance is greater than the first set distance. In this case, the actuation stroke can be increased on the basis of not increasing the length of the shape memory alloy line 5. Moreover, the roller 4 matches the abutting surface 211 smoothly and efficiently, making the structure simple, changing the movement direction, saving the occupied space, and guaranteeing the response speed.

Specifically, the execution member 3 may be placed in an initial position and a target position on the support seat 1. Through the abutting of the abutting surface 211, the roller 4 can drive the execution member 3 to move from the initial position to the target position.

In this embodiment, the included angle A between the second direction and the first direction is 90°. The included angle B between the abutting surface 211 and the first direction is 88°, and tan B is equal to 28.6. Therefore, when the first set distance is 0.1 mm, the second set distance is 2.86 mm.

In other embodiments, the included angle A between the second direction and the first direction and the included angle B between the abutting surface 211 and the first direction may also be set to other angles according to needs as long as the second set distance is greater than the first set distance.

Specifically, the support seat 1 includes a support frame 11 and a positioning member 12. The execution member 3 is slidably disposed on the support frame 11. The positioning member 12 are fixedly disposed on the support frame 11. The transmission member 2 is slidably disposed on the positioning member 12. The support frame 11 and the positioning member 12 carry the execution member 3 and the positioning member 12 respectively, facilitating assembly and maintenance.

More specifically, the support seat 1 includes a guide rod. The execution member 3 is slidably sleeved on the guide rod 13. The arrangement of the guide rod 13 guarantees the stability and reliability of the sliding and movement of the execution member 3.

Specifically, a positioning table 121 protrudes on one side of the positioning member 12 facing the transmission member 2. A transmission table 21 protrudes on one side of the transmission member 2 facing the positioning member 12. The abutting surface 211 is disposed on one side of the transmission table 21. The positioning table 121 is located on the other side of the transmission table 21.

More specifically, a positioning head 212 is disposed on one side of the transmission table 21 facing the positioning table 121. A positioning groove 1211 is disposed on one side of the positioning table 121 facing the transmission table 21. The positioning head 212 matches the positioning groove 1211 to be used for the alignment and positioning of the positioning member 12 and the transmission member 2 in the second direction.

In this embodiment, the support frame 11 is arranged as a housing structure. Two guide rods 13 and one positioning member 12 is fixedly disposed in an internal cavity of the housing structure. The execution member 3 is slidably sleeved on the two guide rods 13 so that the sliding is more balanced. The positioning member 12 and the transmission member 2 are each a plate structure. The transmission member 2 is stacked on the positioning member 12, making the guidance more reliable and saving the occupied space.

Specifically, a plurality of shape memory alloy lines 5 are provided and are spaced apart sequentially in the second direction. The preceding arrangement makes the driving force on the transmission member 2 more balanced and reliable.

More specifically, two shape memory alloy lines 5 are provided. Each shape memory alloy line 5 extends in the first direction, with one end connected to the positioning member 12 through a clip and the other end connected to the transmission member 2 through a clip.

In this embodiment, the two shape memory alloy lines 5 are each clamped between the positioning member 12 and the transmission member 2, saving space and being more secure and reliable.

In other embodiments, a reversing shaft may also be disposed on the transmission member 2. Two ends of each shape memory alloy line 5 wound on the reversing shaft are each connected to the positioning member 12 through a clip.

Specifically, the actuation apparatus further includes slidable connection assemblies 6. The transmission member 2 is slidably disposed on the support seat 1 through the slidable connection assemblies 6. The arrangement of the slidable connection assemblies 6 makes the movement of the transmission member 2 more stable.

More specifically, a slidable connection assembly 6 includes a fixed sliding table 61, a movable sliding table 62, and a ball 63. The fixed sliding table 61 is disposed on the support seat 1. The fixed sliding table 61 is provided with a fixed guide groove 611 penetrating in the first direction. The movable sliding table 62 is disposed on the transmission member 2. The movable sliding table 62 is provided with a movable guide groove 621 penetrating in the first direction. The ball 63 is clamped between the fixed guide groove 611 and the movable guide groove 621. The preceding arrangement reliably improves the frictional resistance when the transmission member 2 moves, thereby reducing the movement speed of the execution member 3 and guaranteeing the reliability and stability of the displacement process of the execution member 3.

In this embodiment, the fixed sliding table 61 is disposed on one side of the positioning member 12 facing the transmission member 2. The movable sliding table 62 is disposed on one side of the transmission member 2 facing the positioning member 12. The roller 63 is located between the positioning member 12 and the transmission member 2, which is more secure and reliable.

In other embodiments, the slidable connection assembly 6 may also be a structure in which a slide rail matches a slide block. The slide rail is disposed on the positioning member 12. The slide block is disposed on the transmission member 2. The slide block is slidably disposed on the slide rail. In other embodiments, the slidable connection assembly 6 may also be a straight rod fixedly disposed on the positioning member 12. The transmission member 2 is slidably sleeved on the straight rod.

Specifically, groove walls on two opposite sides of the fixed guide groove 611 are fixed groove walls. A distance between the two fixed groove walls increases gradually in a direction away from a groove bottom of the fixed guide groove 611. Groove walls on two opposite sides of the movable guide groove 621 are movable groove walls. A distance between the two movable groove walls increases gradually in a direction away from a groove bottom of the movable guide groove 621. The ball 63 is clamped between the two fixed groove walls and the two movable groove walls. The preceding arrangement improves the limit and guide effect on the ball 63 and guarantees that the transmission member 2 slides and moves stably relative to the positioning member 12.

More specifically, the transmission member 2 is slidably disposed on the support seat 1 through two groups of slidable connection assemblies 6. One group of slidable connection assemblies 6 include N slidable connection assemblies 6 arranged sequentially in a first straight line. The other group of slidable connection assemblies 6 include M slidable connection assemblies 6 arranged sequentially in a second straight line. N is less than M. The first straight line and the second straight line are parallel to the first direction and are spaced apart in the second direction. The preceding arrangement makes the guide and limit force of the transmission member 2 in the second direction unbalanced so that the transmission member 2 can swing slightly, avoiding the occurrence of a lock when the abutting surface 211 abuts against the roller 4.

In this embodiment, one slidable connection assembly 6 is disposed in the first straight line. Two slidable connection assemblies 6 are disposed in the second straight line. The first straight line is to the initial position relative to the second straight line. A ball 63 is clamped between the fixed sliding table 61 and movable sliding table 62 of each slidable connection assembly 6.

Specifically, the actuation apparatus further includes an elastic reset member 7 connected to the support seat 1 and the execution member 3 separately and configured to drive the roller 4 to abut against the abutting surface 211. With the arrangement of the elastic reset member 7, when the shape memory alloy lines 5 are powered off, the execution member 3 can automatically return to the initial position, which is more convenient and reliable. When the shape memory alloy lines 5 are powered on and work, the movement of the execution member 3 is more stable.

In this embodiment, the elastic reset member 7 is a coil spring mounted on the positioning member 12 and connected to the execution member 3. In other embodiments, the elastic reset member 7 may also be an ordinary spiral spring clamped between the execution member 3 and the support frame 11.

The present invention further provides an electronic product. The electronic product includes a working module 100 and the preceding actuation apparatus. The execution member 3 is connected to the working module 100.

In the electronic product of the present invention, the abutting surface 211 on the transmission member 2 matches the roller 4 on the execution member 3 to perform the effect of displacement amplification. In this case, when the shape memory alloy lines 5 drive the transmission member 2 to move by the first set distance, the execution member 3 is driven, by the rolling of the roller 4 on the abutting surface 211, to move by the second set distance. The second set distance is greater than the first set distance. In this case, the actuation stroke can be increased on the basis of not increasing the length of the shape memory alloy lines 5. Moreover, the roller 4 matches the abutting surface 211 smoothly and efficiently, making the structure simple, changing the movement direction, saving the occupied space, and guaranteeing the response speed, thereby being able to accurately and reliably drive the working module 100 to move.

Specifically, the electronic product in the present invention may be, for example, an Augmented Reality (AR), a Virtual Reality (VR), or a camera. The working module 100 inside may be driven by one actuation apparatus or through the matching of multiple actuation apparatuses.

Figure 6:
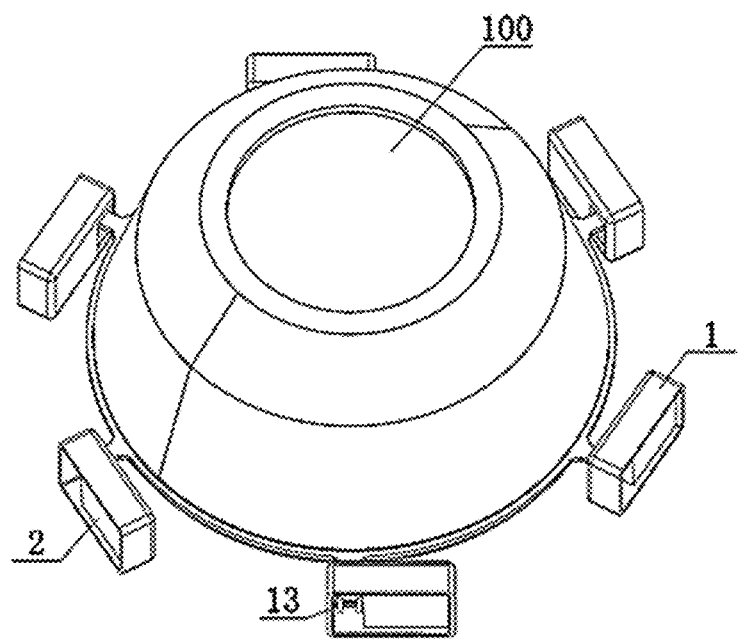
FIG. 6 is a structural view illustrating that the actuation apparatus matches a working module according to one embodiment of the present invention.

As shown in FIG. 6, in an embodiment, the working module 100 in the electronic product is an optical module. Six actuation apparatuses are uniformly disposed around the outer periphery of the optical module.

In this embodiment, when execution members 3 of the six actuation apparatuses move in the same direction, the optical module can be driven to translate. In the six actuation apparatuses, a connection line of execution members 3 of two opposite actuation apparatuses is taken as a reference axis. Execution members 3 of opposite actuation apparatuses on one side of the reference axis move in one direction, and execution members 3 of opposite actuation apparatuses on the other side of the reference axis move in another direction, thus driving the optical module to rotate. The six actuation apparatuses match in pairs so that the optical module can rotate with three reference axes.

Figure 7:
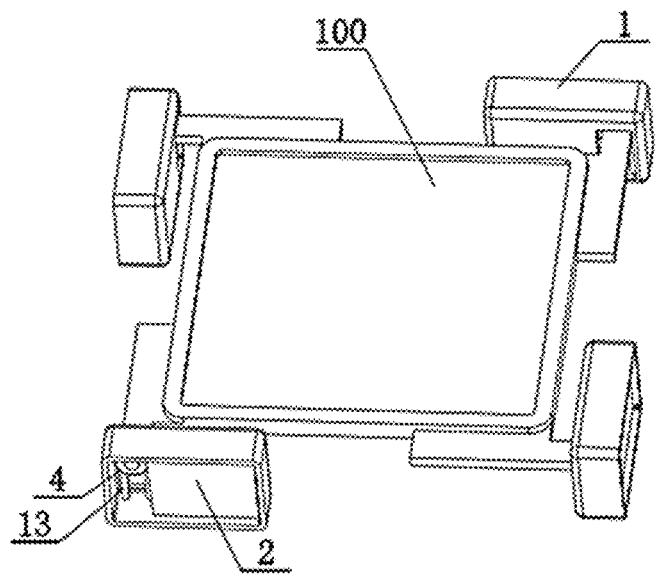
FIG. 7 is a structural view illustrating that the actuation apparatus matches a working module according to another embodiment of the present invention.

As shown in FIG. 7, in an embodiment, the working module 100 in the electronic product is a display module. Four actuation apparatuses are uniformly disposed around the outer periphery of the display module.

In this embodiment, when execution members 3 of the four actuation apparatuses move in the same direction, the display module can be driven to translate.

Figure 8:
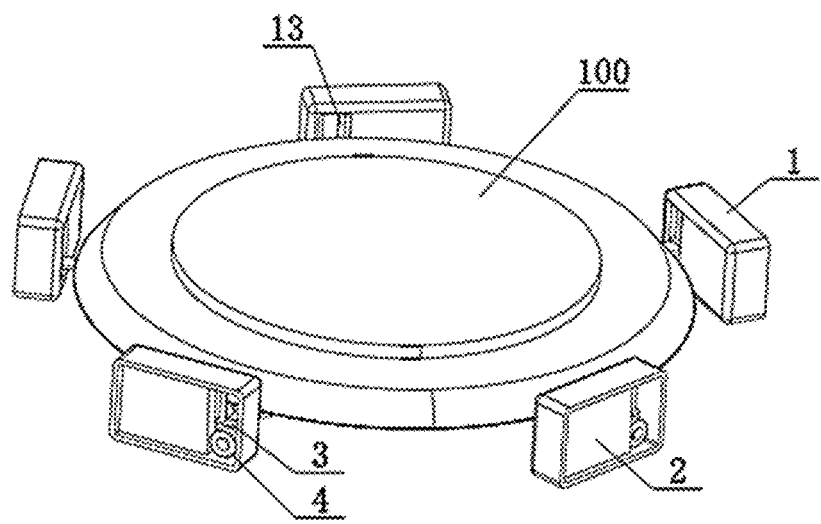
FIG. 8 is a structural view illustrating that the actuation apparatus matches a working module according to another embodiment of the present invention.

As shown in FIG. 8, in an embodiment, the working module 100 in the electronic product is an optical module. Five actuation apparatuses are uniformly disposed around the outer periphery of the optical module.

In this embodiment, when execution members 3 of the five actuation apparatuses move in the same direction, the optical module can be driven to translate so that the optical module implements zooming.

Apparently, the preceding embodiments of the present invention are only illustrative of the present invention and are not intended to limit embodiments of the present invention. Those of ordinary skill in the art can make changes or variations in other different forms based on the preceding description. All embodiments cannot be and do not need to be exhausted herein. Any modifications, equivalent substitutions and improvements made within the spirit and principle of the present invention fall within the scope of the claims of the present invention.

What is claimed is:

1. An actuation apparatus, comprising:
a support seat;
a transmission member slidably disposed on the support seat in a first direction, wherein an abutting surface is disposed on the transmission member;
an execution member slidably disposed on the support seat in a second direction, wherein an included angle is arranged between the second direction and the first direction, and an included angle is arranged between the second direction and the abutting surface;
a roller rotatably disposed on the execution member, wherein a rotation axis of the roller is perpendicular to the first direction and the second direction; and
a shape memory alloy line disposed on the support seat, wherein when powered on and working, the shape memory alloy line is able to drive the transmission member to move; when the transmission member moves, the abutting surface matches the roller to drive the execution member to move; and when the transmission member moves by a first set distance, the execution member moves by a second set distance, wherein the second set distance is greater than the first set distance.

2. The actuation apparatus according to claim 1, further comprising a slidable connection assembly, wherein the transmission member is slidably disposed on the support seat through the slidable connection assembly.

3. The actuation apparatus according to claim 2, wherein the slidable connection assembly comprises:
a fixed sliding table disposed on the support seat, wherein the fixed sliding table is provided with a fixed guide groove penetrating in the first direction;

a movable sliding table disposed on the transmission member, wherein the movable sliding table is provided with a movable guide groove penetrating in the first direction; and a ball clamped between the fixed guide groove and the movable guide groove.

4. The actuation apparatus according to claim 3, wherein groove walls on two opposite sides of the fixed guide groove are fixed groove walls, and a distance between the two fixed groove walls increases gradually in a direction away from a groove bottom of the fixed guide groove;

groove walls on two opposite sides of the movable guide groove are movable groove walls, and a distance between the two movable groove walls increases gradually in a direction away from a groove bottom of the movable guide groove; and the ball is clamped between the two fixed groove walls and the two movable groove walls.

5. The actuation apparatus according to claim 3, wherein the transmission member is slidably disposed on the support seat through two groups of slidable connection assemblies; and one group of slidable connection assemblies among the two groups of slidable connection assemblies comprise N slidable connection assemblies arranged sequentially in a first straight line, and another group of slidable connection assemblies among the two groups of slidable connection assemblies comprise M slidable connection assemblies arranged sequentially in a second straight line, wherein N is less than M, and the first straight line and the second straight line are parallel to the first direction and are spaced apart in the second direction.

6. The actuation apparatus according to claim 1, wherein the support seat comprises:

a support frame, wherein the execution member is slidably disposed on the support frame; and a positioning member fixedly disposed on the support frame, wherein the transmission member is slidably disposed on the positioning member.

7. The actuation apparatus according to claim 1, wherein the support seat comprises a guide rod, and the execution member is slidably sleeved on the guide rod.

8. The actuation apparatus according to claim 1, wherein a plurality of shape memory alloy lines are provided and are spaced apart sequentially in the second direction.

9. The actuation apparatus according to claim 1, further comprising an elastic reset member connected to the support seat and the execution member separately and configured to drive the roller to abut against the abutting surface.

10. An electronic product, comprising a working module and the actuation apparatus according to claim 1, wherein the execution member is connected to the working module.

11. The actuation apparatus according to claim 2, further comprising an elastic reset member connected to the support seat and the execution member separately and configured to drive the roller to abut against the abutting surface.

12. The actuation apparatus according to claim 3, further comprising an elastic reset member connected to the support seat and the execution member separately and configured to drive the roller to abut against the abutting surface.

13. The actuation apparatus according to claim 4, further comprising an elastic reset member connected to the support seat and the execution member separately and configured to drive the roller to abut against the abutting surface.

14. The actuation apparatus according to claim 5, further comprising an elastic reset member connected to the support seat and the execution member separately and configured to drive the roller to abut against the abutting surface.

15. The actuation apparatus according to claim 6, further comprising an elastic reset member connected to the support seat and the execution member separately and configured to drive the roller to abut against the abutting surface.

16. The actuation apparatus according to claim 7, further comprising an elastic reset member connected to the support seat and the execution member separately and configured to drive the roller to abut against the abutting surface.

17. The actuation apparatus according to claim 8, further comprising an elastic reset member connected to the support seat and the execution member separately and configured to drive the roller to abut against the abutting surface.

* * * * *